Nov. 10, 1959   W. D. HUSTON ET AL   2,911,954
FLUID PRESSURE OPERATED ELEMENT POSITIONING DEVICE
Filed Jan. 4, 1955   4 Sheets-Sheet 1
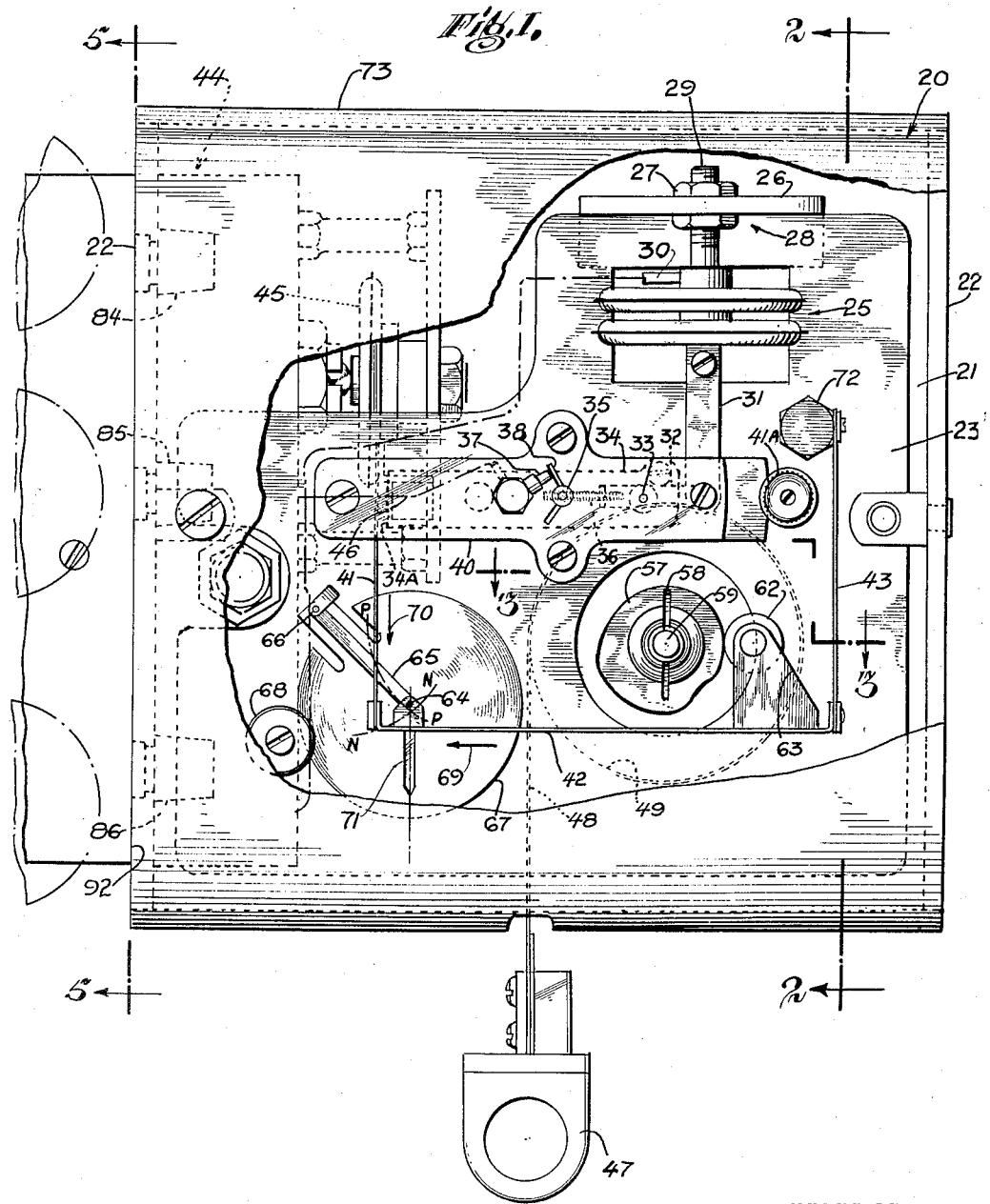
INVENTOR
EDMUND D. HAIGLER
WILLIAM D. HUSTON
BY
Pollard Johnston Smythe & Robertson
ATTORNEYS

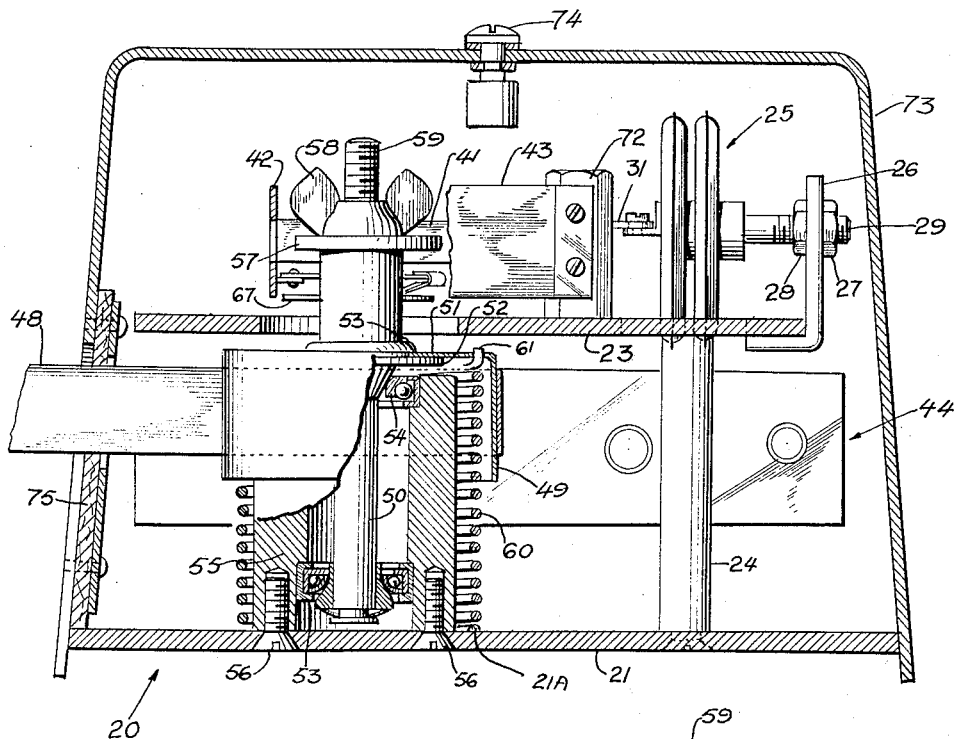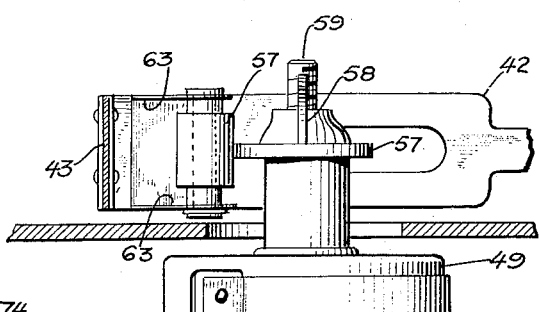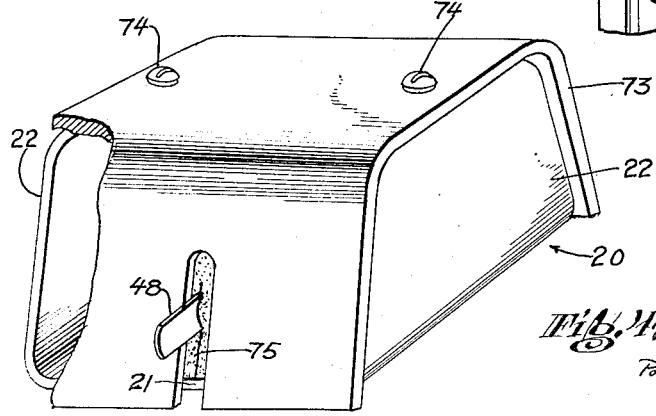

Nov. 10, 1959   W. D. HUSTON ET AL   2,911,954
FLUID PRESSURE OPERATED ELEMENT POSITIONING DEVICE
Filed Jan. 4, 1955   4 Sheets-Sheet 3
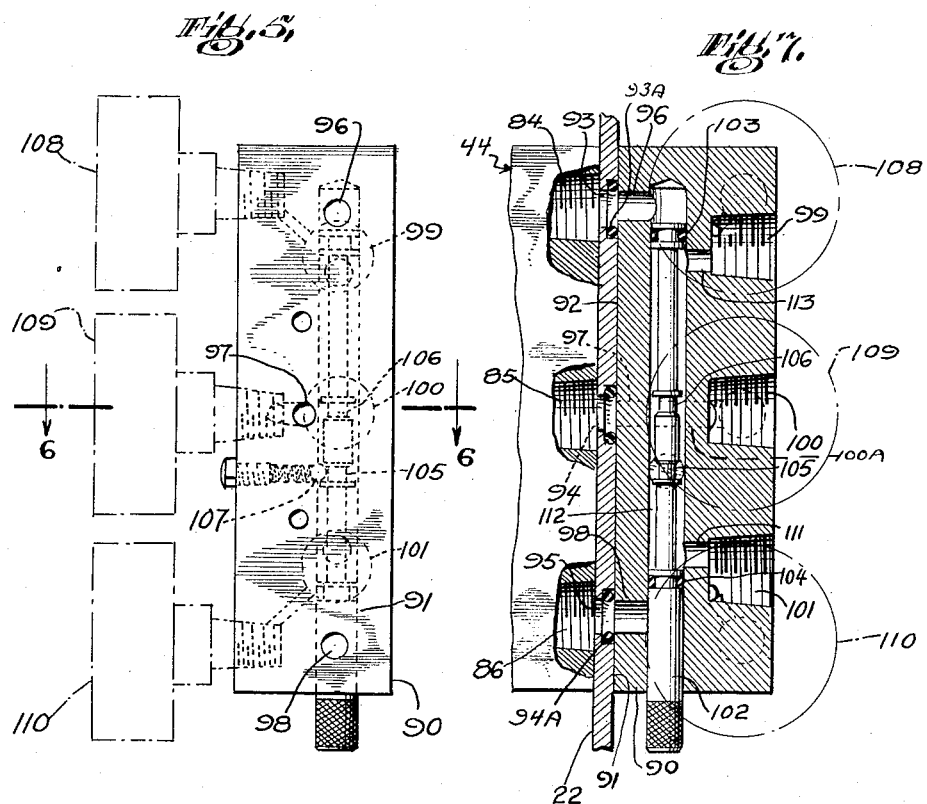
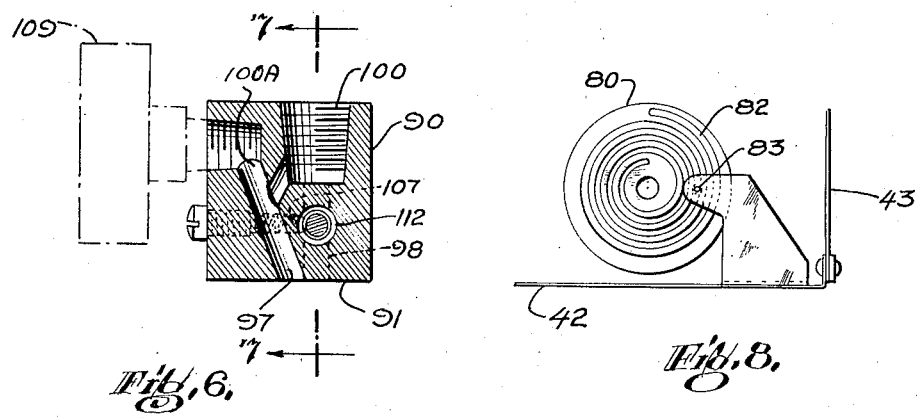
INVENTOR
EDMUND D. HAIGLER
WILLIAM D. HUSTON
BY
Pollard Johnston Smythe & Robertson
ATTORNEYS

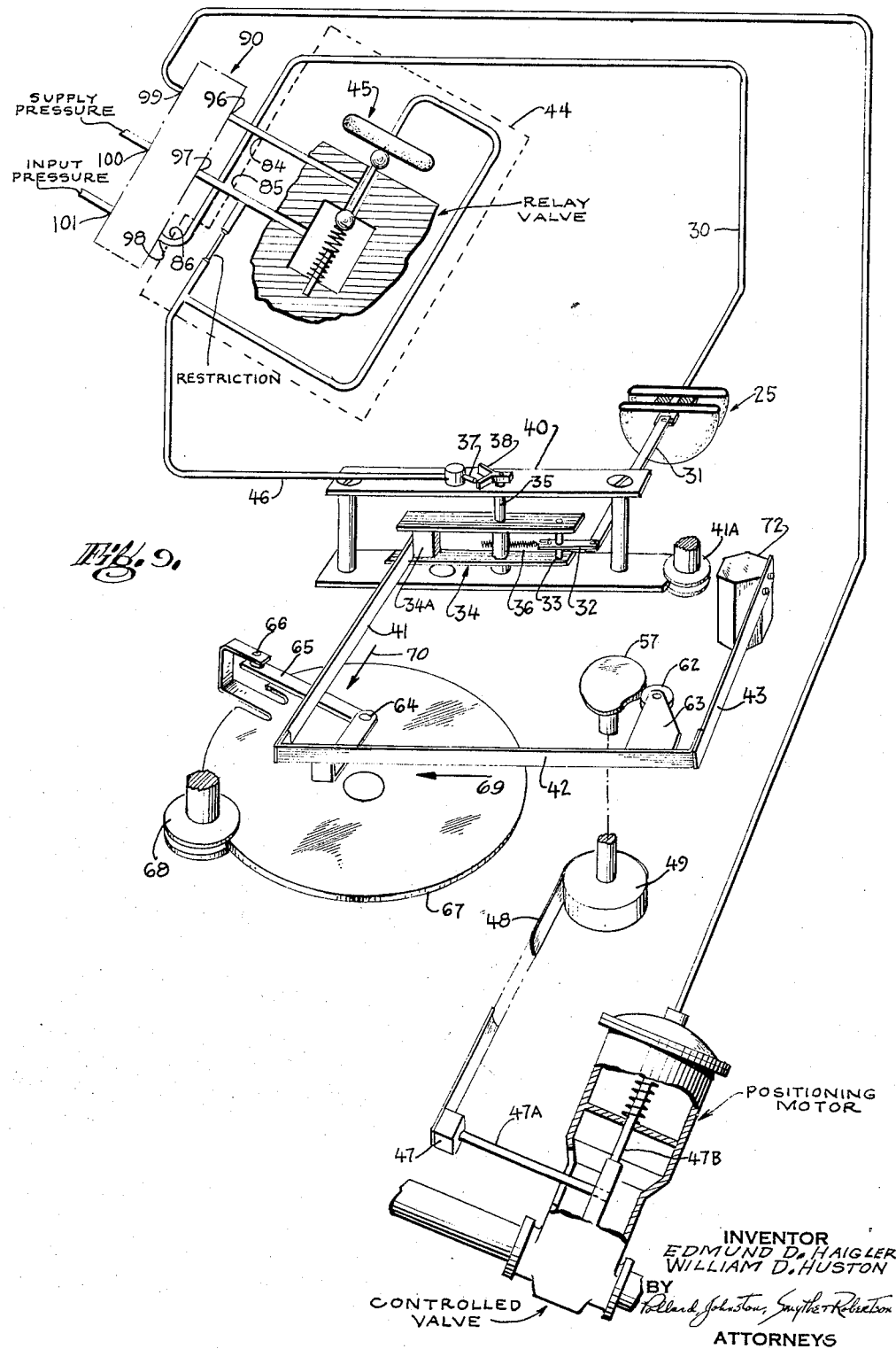

United States Patent Office 2,911,954
Patented Nov. 10, 1959

2,911,954

FLUID PRESSURE OPERATED ELEMENT POSITIONING DEVICE

William D. Huston, Rochester, N.Y., and Edmund D. Haigler, Hatboro, Pa., assignors to American Machine and Metals, Inc., New York, N.Y., a corporation of Delaware Application January 4, 1955, Serial No. 479,788

7 Claims. (Cl. 121—41)

This invention relates to pneumatically operated instruments and particularly an instrument for positioning a valve or other element in response to a control pressure.

In the control of flow of fluids or other materials by means of a valve or other control device, it is necessary in many instances that there be an exact valve or device position for each value of the primary control pressure of a controller or instrument, the control instrument pressure or control pressure being determined by a measured variable or variable condition. The measured variable, for example, may be temperature, pressure, flow or the like. The control pressure also could be manually changed. It is necessary to make certain that the valve or device will follow precisely any changes in the control pressure positioning the valve or device. In many instances, the valve may be a diaphragm operated arrangement controlled by the output pressure of the valve controller or positioner.

One of the objects of the invention is to provide an improved device controller or positioner which is sensitive and accurate, the positioner being connectable with the valve or element to be controlled in a manner which facilitates its employment for any desired use.

Another object of the invention is to provide an improved arrangement for bypassing the automatic operation of the positioner.

A still further object of the invention is to provide an instrument which is compact in size and simple in construction.

In one aspect of the invention, an element having a movable part, such as a capsule or stack of capsules, can be made responsive to the measured variable or control pressure of a controller or instrument. The device can be arranged to accommodate a Bourdon tube or other responsive means. The control instrument or control pressure responsive device or capsule can be connected to a lever mounted on a differential carriage, the lever being pivoted about an axis spaced from the pivoted axis of said differential carriage. A flapper can be mounted on the axis of the differential carriage, said flapper being movable by the aforementioned lever. A carrier can be rotatably mounted on the axis of the differential carriage and the flapper, said carrier having mounted upon it a nozzle cooperating with the flapper to produce a nozzle pressure. The nozzle is connected to a source of supply air through a restriction, movement of the flapper and nozzle relative to each other in response to a change of output pressure in the measuring device, causing a change in pressure in the nozzle. The nozzle pressure is connected to a pressure responsive relay which furnishes an output pressure for operating the valve or element to be controlled. Movement of the valve or element to be controlled is fed back through a feed back arrangement to the differential carriage so as to tend to reposition the nozzle and flapper relative to each other after a change in their relationship.

One of the principal aspects concerns the connection between the valve and differential carriage preferably including a drum with a cooperating tape which in its normal unflexed condition has a transverse cross-section related to said drum upon which it is wound and unwound in such a manner as not to match. In the illustrated form, the drum can have a flat surface and the tape a non-flat cross section but the reverse arrangement could be used. The drum may have a cam arrangement operated thereby for driving a feed back lever system connected to the differential carriage.

In a further aspect, the cam can be arranged to have a helical slot with a suitable follower and thus provide for a plurality of turns of the drum, such depending upon the particular arrangement of parts.

The pressure responsive relay concerned may comprise a rigid base arrangement having parts mounted thereon as described in copending application Serial No. 461,276, filed October 8, 1954.

Adjoining the pressure responsive relay and on the outside of the case, if desired, a transfer plate or bypass block arrangement can be employed for connecting the positioner. The purpose of such a block is to provide means for transfer of the operation of the valve or device to be controlled from positioner to remote or direct operation. Also, the positioner can be removed from the block for adjustment or repair. The positioner can be arranged so that the transfer block can be omitted.

These and other objects, advantages and features of the invention will become apparent from the following description and drawings, which are merely exemplary.

In the drawings:

Fig. 1 is a front view of a positioner with the cover partially broken away in order to show the internal arrangement.

Fig. 2 is a section along the line 2—2 of Fig. 1.

Fig. 3 is a fragmentary view taken along the line 3—3 of Fig. 1.

Fig. 4 is a reduced fragmentary view of the case looking from the bottom of Fig. 1, a portion of the case being broken away to show its construction.

Fig. 5 is a reduced side view of the bypass block, looking in the direction of line 5—5 of Fig. 1, the gauges being shown schematically.

Fig. 6 is a sectional view taken along the line 6—6 of Fig. 5.

Fig. 7 is a sectional view taken along the line 7—7 of Fig. 6, a fragmentary portion of the casing and of the relay base being shown so as to illustrate one manner of connecting the parts.

Fig. 8 is a fragmentary view of an alternate form of cam.

Fig. 9 is a schematic diagram of the positioner being used in a valve controlling arrangement.

Casing 20 of the instrument, comprising a back plate 21 and side wings 22, may carry pneumatically responsive mounting mechanism plate 23, said plate 23 being spaced from the back plate 21 by spacer posts, one of which is shown at 24 (Fig. 2). Capsule arrangement 25 is mounted on bracket 26 by means of nuts 27, 28 and stud 29. In place of the stack of capsules or wafers 25, other types of responsive elements responsive to control instrument or input pressure may be used such as Bourdon springs, bimetallic elements, etc. The interior of capsule means 25 is connected by pipe 30 with the control pressure fed to the positioner through the block 44, the pipe connection being schematically illustrated.

Link 31 is connected to lever 32 pivotally mounted at 33 on differential carriage 34, said differential carriage being rotatably mounted about axis 35. A preset spring or similar connection 36 may connect lever 32 with flapper 38 for rotating it about axis 35. Nozzle 38 is mounted on adjustable carrier 40, said carrier 40 also may be rotatable about axis 35 or any suitable axis spaced therefrom. Carrier 40 is rotatable by means of position adjustment knob 41A so as to change the location of nozzle 37 relative to flapper 38 and thus adjust the operating point of the valve.

The other end of differential carriage 34 is connected at 34A to the feedback mechanism from the valve being positioned by means of links 41, 42 and 43.

A pressure responsive relay 44 may be mounted on a side wing 22 of the casing 20, said pressure relay having a rigid base block with parts mounted thereon as described in copending application Serial No. 461,276, filed October 8, 1954.

The relay has supply air connections, output or valve pressure connections, and measured variable or control input connections in its base as described in said copending application Serial No. 461,276. As shown in Fig. 9, capsule means 45 is carried on said base, said capsule means controlling a relay valve in said pressure relay 44 between the supply air connection 85 and the output connection 84 to the valve to be controlled.

When capsule 45 has pressure exerted thereon, it will tend to open the connection between the supply air and output control pressure and close the connection between the output pressure and atmosphere as is known in pressure relays. Capsule 45 is controlled by the pressure in the nozzle passage, said nozzle passage being supplied through line 46 from the supply connection through a restriction. Thus, as the measuring instrument or input pressure on capsule assembly 25 is changed, it will cause a relative movement between the flapper and nozzle which in turn will be reflected in capsule 45. Movement of capsule 45 will change the position of the relay valve operated thereby so as to cause a change in output pressure to the valve or element being controlled by the valve positioner.

In order to feed back movement of the valve being controlled, suitable fastening bracket 47 (Figs. 1 and 9) can be attached to tape or motion transmitter 48 and extension 74A of valve stem 47B. Tape 48 in the form shown has a non-flat transverse cross section (Fig. 4) when in its normal or unflexed position. Drum 49 (Fig. 1, Fig. 2) is held on drum mounting post 50, face 51 of said drum being held by the flanges 52 and 53 of the drum post 50. Drum post 50 is rotatably mounted in bearings 53 and 54 carried by bearing post 55, bearing post 55 being fastened to the back plate of casing 20 by screws 56.

Cam 57 is adjustably carried on drum post 50 by engagement of tightening or adjusting screw 58 on the screw threaded extension 59 of drum post 50, tape 48 being suitably fastened to the drum. As the tape is wound upon the drum, it will flatten. Spring 60 having one end held in the back plate 21 at 21A and its other end 61 mounted in an aperture in drum 49, is arranged to urge drum 49 in a clockwise direction in Fig. 1 tending to wind tape 48 thereon.

As the valve governed by the apparatus changes position, tape 48 will be wound and unwound on the drum, thus turning cam 57. Cam 57 has cam follower 62 in engagement therewith, cam follower 62 being carried on link 42 by brackets 63. Link 42 is guided at pivot 64 by arm 65. Arm 65 in turn is supported at its other end at pivot 66 on the rotatable adjusting disk 67, said disk being adjustable by friction knob 68 so as to move the relative position of pivot 66.

With the parts arranged as shown, as link 42 moves in the direction of arrow 69, link 41 will move downwardly in the direction of arrow 70. This is because pivot 64 will rotate about pivot 66, the arm 65 moving clockwise about said pivot 66 when link 42 moves to the left. It should be apparent that as arm 65 pivots clockwise, pivot 64 will move in a path concentric to pivot 66 and thus downwardly along path N—N (Fig. 1) which will move link 41 downwardly. As pivot point 66 is moved clockwise so as to be on the opposite side of vertical line 71, the movement in the direction 69 of link 42 will result in an upward movement of link 41. This is because if pivot 66 be moved to the right of centerline 71, then clockwise rotation of arm 65 about pivot 66 will result in pivot 64 following an arcuate path and in an up direction as can be seen schematically indicated by path P—P (Fig. 1). Thus, the feed back mechanism can be adjusted to operate in either direction as needed in accordance with the position of nozzle 37 on its post. Link 43 is held on mounting plate 23 by post 72.

If desired, cover 73 can be fastened by screws 74 over the casing 20 so as to enclose the apparatus, tape 48 passing through the felt covered aperture 75.

The tape preferably is made of metal but can be made of other flexible substances. As previously mentioned, the surface of the drum may be other than flat and the tape flat in normal position so that the tape bends as it winds thereon.

As a still further alternative, if it is desired to have the parts arranged so that the drum makes more than one revolution in its operation, disk 80 (Fig. 8) with a helical slot 82 can be used in place of cam 57, a suitable follower 83 being engaged in said slot and attached to link 42. Turning of disk 80 by the tape and drum will result in movement of links 42 and 41 as described for Figs. 1 and 2.

In one form of the invention a transfer plate or block can be used for carrying the valve positioner, the transfer plate having input pressure, supply pressure and valve control pressure pipes connected thereto. The base of pressure relay 44 also has similar threaded apertures as seen at 84, 85 and 86 in Figs. 1, 7 and 9 so that it can be connected directly to the respective pressure pipes.

Base 90 of the transfer plate assembly may have face 91 mountable in contact with outside face 92 of side wing 22 of the positioner casing, there being apertures 93, 94 and 95 in said side wing 22 registering with outlet control pressure passage 96, supply pressure passage 97 and input or instrument pressure passage 98 in said transfer plate base 90. O-rings 93A, 94A and 95A are provided to seal the connections. The outlet pressure pipe to the controlled valve or device can be connected to threaded aperture 99, supply pressure to threaded aperture 100, and input pressure to threaded aperture 101.

Rectilinearly slideable valve plunger 102 can have suitable shoulders and O-rings 103, 104 cooperating with the valve passage in a manner about to be described. Reduced portions 105, 106 and their shoulders are cooperable with the spring pressed detent ball 107 to properly position the plunger in either of its two positions.

Suitable outlet pressure gauge 108, supply pressure gauge 109 and input pressure gauge 110 can be mounted in their respective apertures in transfer plate base 90. As seen in Fig. 6, the supply pressure gauge 109 and supply pressure connection 100 are connected by passage 100A with the supply pressure passage 97.

When the valve plunger is in the position shown in Figs. 5 and 7, input pressure will be connected through connecting aperture 101, passage 111, bore 112, passage 113, and connecting aperture 99 to the valve or device to be controlled. Passages 96 and 98 to the valve positioner will be closed relative to bore 112 and thus the valve positioner will be inoperative, the input pressure being directly operative upon the valve to be controlled.

When the valve positioner is to be arranged in operative relationship, plunger 102 can be pulled outwardly or downwardly as viewed in Figs. 5 and 7 until yieldable detent 107 engages reduced portion 106 of the valve plunger 112. This will cause the O-ring 104 to be positioned below passage 98 so as to open a passage between input connection 101 and passage 98, thus connecting the input pressure to the input of the valve positioner. O-ring 103 also will be caused to be positioned below passage 113 so as to connect the output or control pressure connection 84 through passage 96, bore 112 connecting passage 113 to aperture 99. In this position, O-ring 103 also closes the previous bypass or interconnection from aperture 99 to aperture 101 through bore 112. Preferably, after the openings 96, 98, 113 and 111 are drilled or formed, the edges thereof are rounded so as to permit proper operation of the O-ring in conjunction therewith.

It should be apparent that various details of construction can be changed without departing from the spirit of the invention except as defined in the appended claims.

What is claimed is:

1. In an element positioning pneumatic control apparatus, the combination comprising a flapper and nozzle operating assembly, means moving said flapper and nozzle relative to each other, and element position feedback means directly repositioning said flapper and nozzle relative to each other after a movement thereof in response to travel of said element positioned thereby, said feedback means including a flexible strip tape means, means for directly connecting said tape means to said element, a drum upon which said tape is wound and unwound, said tape and drum having non-matching normal cross sections, and connection means between said drum and said flapper and nozzle operating assembly for repositioning said flapper and nozzle directly in response to movement of said element.

2. In an element positioning pneumatic control apparatus, the combination comprising a flapper and nozzle operating assembly for producing a pneumatic control pressure, means moving said flapper and nozzle relative to each other in response to a signal thereto, a flexible tape directly movable by said element, a drum upon which said tape is wound and unwound as said element is moved, said tape having a normal non-flat cross section, and an operating connection between said drum and said flapper and nozzle operating assembly for directly feeding back movement of said element to reposition said flapper and nozzle relative to each other so as positively to position said element in accordance with said signal.

3. In an element positioning pneumatic control apparatus, the combination comprising a flapper and nozzle operating assembly, means moving said flapper and nozzle relative to each other, and element position feedback means directly repositioning said flapper and nozzle relative to each other after a movement thereof in response to travel of said element positioned thereby, said feedback means including a flexible tape means and means directly connecting said tape means to said element, a drum upon which said tape is wound and unwound, said tape and drum having non-matching normal cross sections, cam and follower means between said drum and said flapper and nozzle operating assembly for directly feeding back thereto movement of said element, and adjustable mounting means for said cam.

4. In an element positioning pneumatic control apparatus, the combination comprising a flapper and nozzle operating assembly, means moving said flapper and nozzle relative to each other in response to a changeable condition, flexible tape means, means for directly connecting said tape means to said element, a drum upon which said tape is wound and unwound, said tape and drum having non-matching normal cross sections, swingable link means including a plurality of flexible arms connected to said flapper and nozzle operating assembly for repositioning the same in accordance with the position of said element, a cam operable by said drum, and a cam follower mounted on one of the arms of said link means, movement of said tape moving said cam and follower to feed back movement of said element in response to said condition.

5. In an element positioning pneumatic control apparatus, the combination comprising a flapper and nozzle operating assembly, means moving said flapper and nozzle relative to each other in response to a changeable condition, flexible tape means, means for directly connecting said tape means to said element, a drum upon which said tape is wound and unwound, said tape and drum having non-matching normal cross sections, swingable link means connected to said flapper and nozzle operating assembly for repositioning the same in accordance with the position of said element, said link means having one portion fixed so that the link means will pivot thereabout, a cam operable by said drum, rotatable link suspension means holding said link means at a point remote from where it is fixed, said suspension means being rotatable so as to change path of travel of said link means and thereby the relative movement and direction of movement of said link means, and a cam follower mounted on said link means, movement of said tape moving said cam and follower to feed back movement of said element in response to said condition.

6. In a valve positioner having relatively movable flapper and nozzle devices, the combination comprising a loading pressure means, a differential carriage rotatable about an axis, one of said devices being rotatable about said axis, a lever mounted on said carriage and connected to said condition loading pressure means and said last mentioned device, and a connection between the valve to be positioned and said carriage, said connection including a bowed metallic tape directly movable by said valve and link means operated by said tape.

7. In an element positioning apparatus, the combination comprising a case, a flapper and nozzle operating assembly in said case, means moving said flapper and nozzle relative to each other, feedback means repositioning said flapper and nozzle relative to each other after a movement in response to travel of said element positioned thereby, an air relay means carried by said case, said relay means having connection devices for selectively directly connecting input and output pressure lines thereto, a transfer plate adapted to have said positioner mounted thereon, said transfer plate having connection devices for receiving input and output pressure lines and passages registering with said connection devices of said relay means, and valve means in said transfer plate for bypassing said air relay means, so that said case and associated means can be removed from said transfer plate.

References Cited in the file of this patent

UNITED STATES PATENTS

| | | |
|---|---|---|
| 1,964,280 | Witchger | June 26, 1934 |
| 2,065,702 | Hubbard | Dec. 29, 1936 |
| 2,240,244 | Cook | Apr. 29, 1941 |
| 2,487,266 | Newell | Nov. 8, 1949 |
| 2,528,735 | Bristol | Nov. 7, 1950 |
| 2,632,456 | Breedlove | Mar. 24, 1953 |
| 2,638,117 | Horn | May 12, 1953 |
| 2,653,578 | Moore | Sept. 29, 1953 |
| 2,694,315 | Swift | Nov. 16, 1954 |
| 2,706,466 | Rosenberger | Apr. 19, 1955 |